United States Patent
Clark et al.

(10) Patent No.: US 10,907,492 B2
(45) Date of Patent: Feb. 2, 2021

(54) BLADE OUTER AIR SEAL WITH SEPARATE FORWARD AND AFT PRESSURE CHAMBERS

(71) Applicant: United Technologies Corporation, Farmington, CT (US)

(72) Inventors: Thomas E. Clark, Sanford, ME (US); William M. Barker, North Andover, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 188 days.

(21) Appl. No.: 16/124,480

(22) Filed: Sep. 7, 2018

(65) Prior Publication Data
US 2020/0080437 A1    Mar. 12, 2020

(51) Int. Cl.
F01D 11/08    (2006.01)
F01D 25/24    (2006.01)

(52) U.S. Cl.
CPC .......... F01D 11/08 (2013.01); F01D 25/246 (2013.01); F05D 2220/323 (2013.01); F05D 2240/11 (2013.01); F05D 2240/55 (2013.01)

(58) Field of Classification Search
CPC .......... F05D 2220/323; F05D 2240/11; F05D 2240/55; F05D 2220/321; F01D 11/10; F01D 11/125; F01D 11/08; F01D 25/246; F01D 11/005
See application file for complete search history.

(56) References Cited

U.S. PATENT DOCUMENTS

| 6,146,091 A | 11/2000 | Watanabe et al. |
| 7,063,503 B2 | 6/2006 | Meisels |
| 8,814,507 B1 | 8/2014 | Campbell |

(Continued)

FOREIGN PATENT DOCUMENTS

| EP | 3064717 A1 | 9/2016 |
| EP | 3315732 A1 | 5/2018 |

OTHER PUBLICATIONS

European Search Report for EP Application No. 19195574.9 dated Feb. 4, 2020.

*Primary Examiner* — J. Todd Newton
*Assistant Examiner* — Andrew J Marien
(74) *Attorney, Agent, or Firm* — Carlson, Gaskey & Olds, P.C.

(57) ABSTRACT

A gas turbine engine includes a turbine blade rotating about an axis of rotation defining an axial direction. A blade outer air seal is positioned radially outward of a radially outer tip of the turbine blade. The blade outer air seal has a forward support and an aft support. The forward support is supported on a forward hook from a blade outer air seal support. The aft support is supported on an aft hook from the blade outer air seal support. The blade outer air seal has a central web extending between the forward support and the aft support and radially outwardly of the turbine blade radially outer tip. A radially outer chamber is defined radially outwardly of the central web, and axially intermediate the forward support and the aft support. The radially outer chamber is divided into at least two separate subchambers maintained at two different pressures. A forward subchamber is at a higher pressure than an aft subchamber. A seal separator separates the forward and aft subchambers.

12 Claims, 3 Drawing Sheets

(56) References Cited

U.S. PATENT DOCUMENTS

| | | | | |
|---|---|---|---|---|
| 10,337,346 | B2* | 7/2019 | McCaffrey | F01D 11/02 |
| 2005/0232752 | A1* | 10/2005 | Meisels | F01D 25/24 |
| | | | | 415/116 |
| 2013/0113168 | A1* | 5/2013 | Lutjen | F16J 15/0887 |
| | | | | 277/644 |
| 2016/0258311 | A1* | 9/2016 | Varney | F01D 25/12 |
| 2018/0058230 | A1* | 3/2018 | Propheter-Hinckley | |
| | | | | F01D 25/12 |
| 2019/0093491 | A1* | 3/2019 | O'Neill | F01D 9/00 |

* cited by examiner

BLADE OUTER AIR SEAL WITH SEPARATE FORWARD AND AFT PRESSURE CHAMBERS

BACKGROUND

This application relates to a blade outer air seal for use in a gas turbine engine wherein the pressure radially outward of the blade outer air seal is separated into a forward and aft chamber.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

SUMMARY

In a featured embodiment, a gas turbine engine includes a turbine blade rotating about an axis of rotation defining an axial direction. A blade outer air seal is positioned radially outward of a radially outer tip of the turbine blade. The blade outer air seal has a forward support and an aft support. The forward support is supported on a forward hook from a blade outer air seal support. The aft support is supported on an aft hook from the blade outer air seal support. The blade outer air seal has a central web extending between the forward support and the aft support and radially outwardly of the turbine blade radially outer tip. A radially outer chamber is defined radially outwardly of the central web, and axially intermediate the forward support and the aft support. The radially outer chamber is divided into at least two separate subchambers maintained at two different pressures. A forward subchamber is at a higher pressure than an aft subchamber. A seal separator separates the forward and aft subchambers.

In another embodiment according to the previous embodiment, there are a plurality of circumferentially spaced seal separators.

In another embodiment according to any of the previous embodiments, seals are positioned in circumferential ends of the circumferentially separate seal separators to seal a circumferential gap between adjacent ones of the circumferentially separate seal separators.

In another embodiment according to any of the previous embodiments, the seal separators include a radially outer head positioned in a ditch in the blade outer air seal support.

In another embodiment according to any of the previous embodiments, the head maintains a seal in a seal groove in the blade outer air seal support.

In another embodiment according to any of the previous embodiments, each the seal separator has a leg extending radially inward from the head to a seal separator foot and the foot maintaining a second seal against a radially outer surface of the central web. The second seal is received in a groove in the foot.

In another embodiment according to any of the previous embodiments, each the seal separator has a plurality of orifices metering flow to achieve the lower pressure in the aft subchamber.

In another embodiment according to any of the previous embodiments, seal separator hooks are received in a static structure to axially position each the seal separator.

In another embodiment according to any of the previous embodiments, the seal separator hooks further prevents rotation of each the seal separator about the axis of rotation.

In another embodiment according to any of the previous embodiments, the seal separator hooks extend in a ditch in a finger from the blade outer air seal support.

In another embodiment according to any of the previous embodiments, the leg extends in a direction having a radially inward component and an axially aft component when extending from the head to the foot.

In another embodiment according to any of the previous embodiments, the seal separator includes a radially outer head positioned in a ditch in the blade outer air seal support.

In another embodiment according to any of the previous embodiments, the head maintains a seal in a seal groove in the blade outer air seal support.

In another embodiment according to any of the previous embodiments, the seal separator has a leg extending radially inward from the head to a seal separator foot and the foot maintaining a second seal against a radially outer surface of the central web. The second seal is received in a groove in the foot.

In another embodiment according to any of the previous embodiments, the seal separator has a plurality of orifices metering flow to achieve the lower pressure in the aft subchamber.

In another embodiment according to any of the previous embodiments, the leg extends in a direction having a radially inward component and an axially aft component when extending from the head to the foot.

In another embodiment according to any of the previous embodiments, the seal separator has a plurality of orifices metering flow to achieve the lower pressure in the aft subchamber.

In another embodiment according to any of the previous embodiments, seal separator hooks are received in a static structure to axially position the seal separator.

In another embodiment according to any of the previous embodiments, the seal separator hooks further prevents rotation of the seal separator about the axis of rotation.

In another embodiment according to any of the previous embodiments, the seal separator hooks extend in a ditch in a finger from the blade outer air seal support.

These and other features may be best understood from the following drawings and specification.

DETAILED DESCRIPTION

Figure 1:
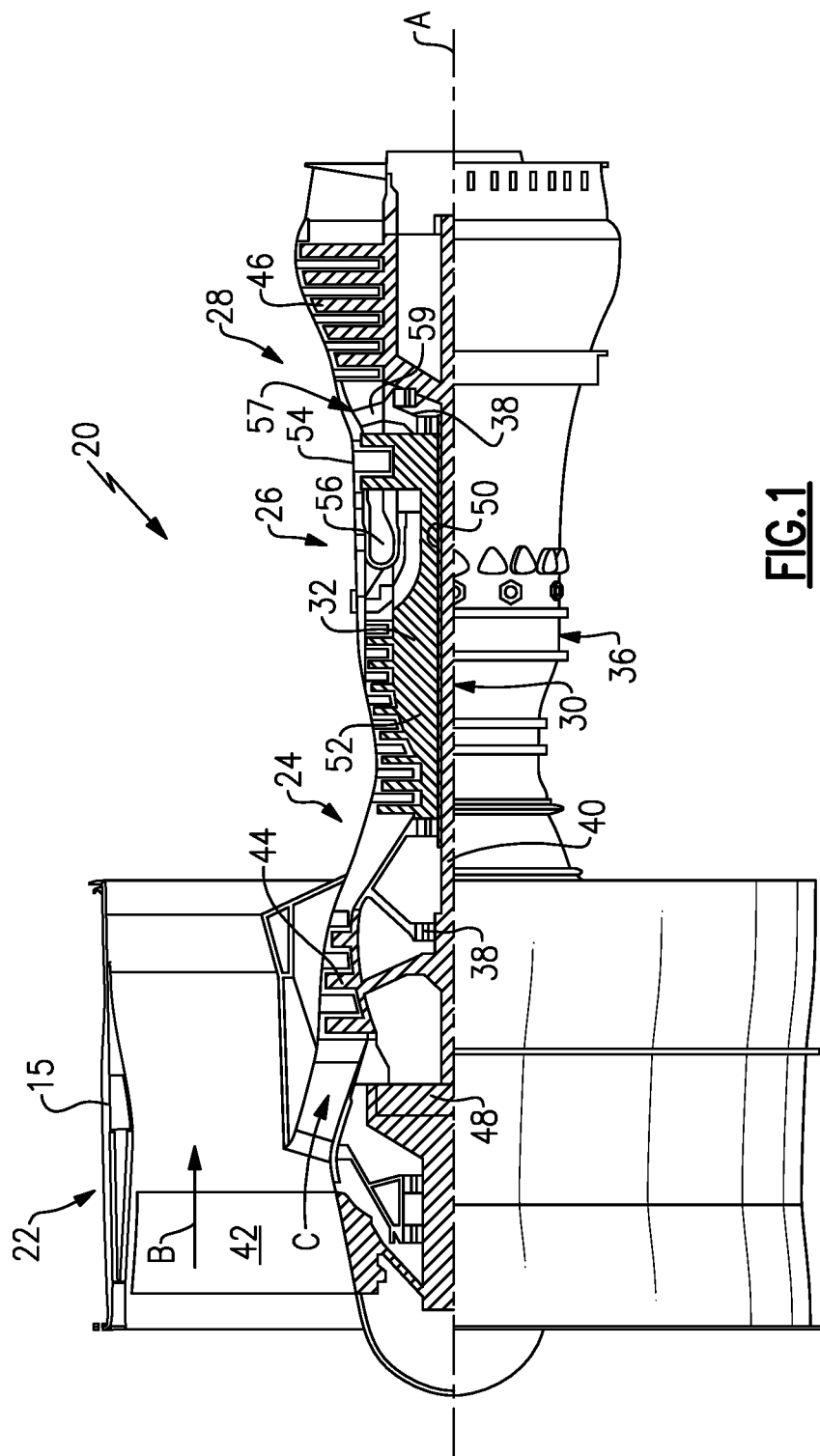
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2A:
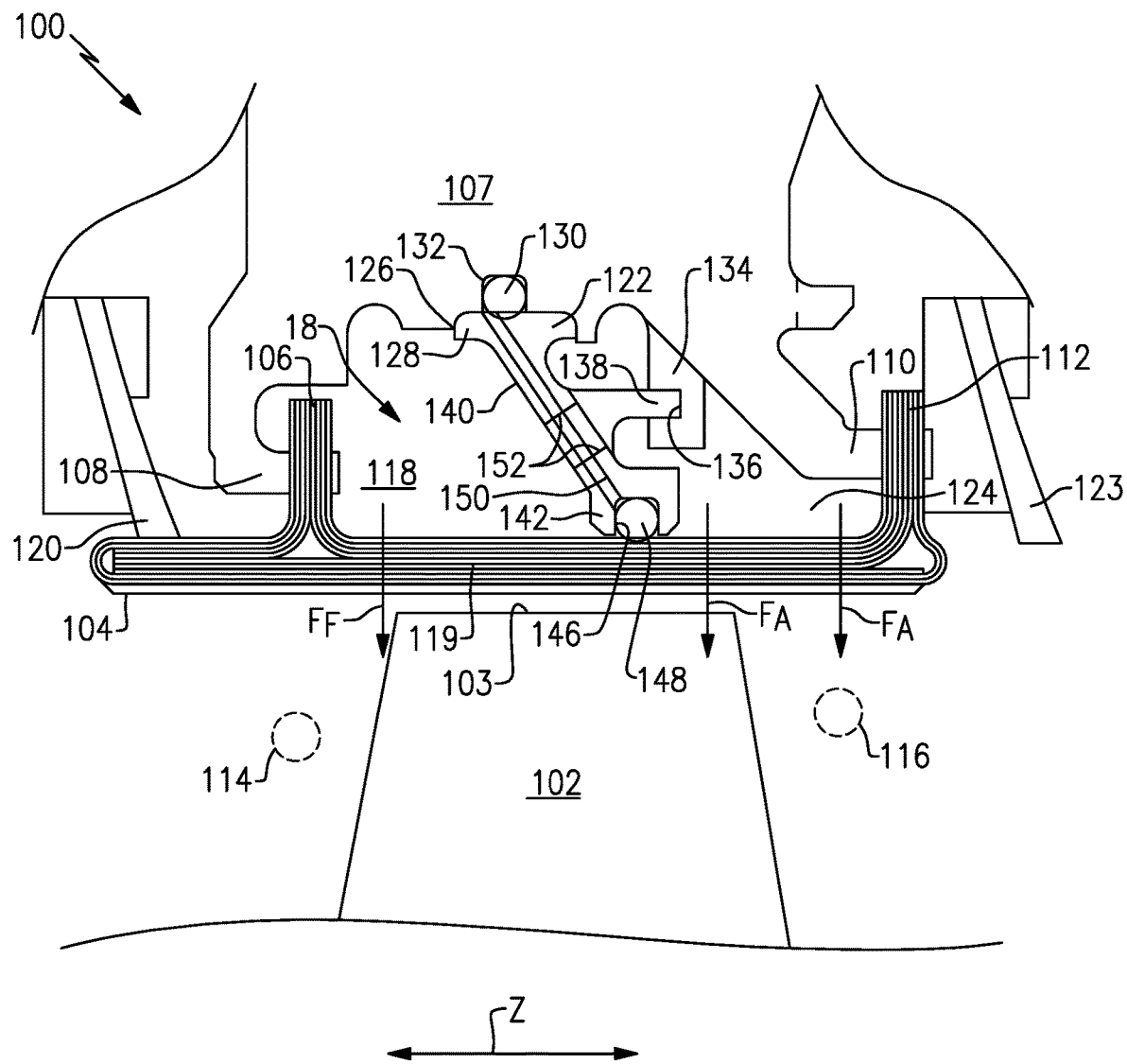
FIG. 2A shows a turbine section that may be incorporated into a gas turbine engine.

FIG. 2A shows a turbine section 100. A turbine blade 102 rotates about an axis of rotation Z. The turbine blade 102 extends to a radially outer tip 103. As is known, it is desirable for all the products of combustion downstream of a combustor to pass over the turbine blades. Thus, a blade outer air seal ("BOAS") 104 is positioned radially outwardly of the tip 103 to minimize leakage around the blades 102. The BOAS has a forward support 106 supported on a hook 108, which is part of a BOAS support 107. BOAS support 107 may be a part separate from a larger static structure, and supported on the larger static structure. Alternatively, the support 107 may be part of the larger static structure An aft hook 110 supports an aft support 112 which is also part of the BOAS 104.

Figure 2B:
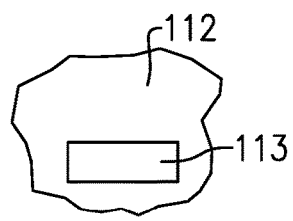
FIG. 2B schematically shows a detail of a way to support a blade outer air seal.

As shown in FIG. 2B, the aft support 112 may have a slot 113 to receive the hook 110. The support 106 can be similarly formed. The slot 112 is shown generally rectangular. However the term "slot as used herein may extend to any shape.

The BOAS to this point may be as generally described in co-pending U.S. patent application Ser. No. 16/108,335, filed on Aug. 22, 2018, and entitled "Blade Outer Air Seal Formed of Laminate and Having Radial Support Hooks."

In addition, the BOAS 104 may be formed of a plurality of laminate of ceramic matrix composite materials and may be formed by a method in construction as generally described in co-pending U.S. patent application Ser. No. 16/055,636, filed on Aug. 6, 2018, and entitled "Blade Outer Air Seal Reinforcement Laminate."

However, while a particular BOAS is illustrated and described in FIG. 2A, BOAS of any other construction may benefit from the teachings of this disclosure. While the hook supports 106 and 112 are shown extending generally radially outwardly, a more conventional hook support, which bends in an axial direction to sit on the hooks 108 and 110, may be utilized. Moreover, any number of materials can be utilized to form the BOAS 104.

The details of this disclosure relate to controlling pressures which are within a radially outer chamber 18 radially outward of a central web 119 of the BOAS 104, and axially between the supports 106 and 112. It is typical that the chamber 18 between the supports 106 and 112 is generally at a common pressure throughout its entire axial length.

Applicant has recognized that the pressure at a location 114 forward of the blade 102 will be greater than the pressure at a point 116 aft of the blade 102. However, if the pressure in the chamber 18 is constant, then an inward force at locations $F_F$ and $F_A$ forward and aft of the blade 102 will also be generally equal. This can result in an undesirably large force imbalance between the force $F_A$ and the pressure at point 116.

As shown, there may be an axially forward seal 120 and axially aft seal 123. Seal 120 seals against the BOAS 104. Seal 123 may seal on a downstream vane, not shown.

The chamber 18 is now separated into two subchambers 118 and 124. A seal separator 122 provides this separation. Seal separator 122 includes a radially outer head 128 which sits within a slot 126 in the support 107. The head 128 forces a seal 130 to seal within a slot 132 in the support 107. While the seal 130 is shown to be an O-ring, or rope seal, any other shape seal, such as a W or M shaped-seal may be utilized.

A radially inwardly extending leg 140 extends from head 128 to foot 142 of the seal separator 122. The foot 142 has a slot 146 receiving an O-ring 148. Again, while an O-ring is used, any other shape seal may be utilized.

A feather seal slot 150 is formed at circumferential ends of the seal separator 122. As will be explained, there may be a plurality of circumferentially seal separators seal 122 which together surround the axis of rotation Z. Feather seals will be placed in the slots 150, as explained below, to seal circumferential gaps between the separate seal separators 122.

Hooks 138 may extend into ditches 136 in a radially inwardly extending finger 134 from the support 107. This will axially position the seal separator 122, and further provide an anti-rotation feature, as will be better described below.

Metering orifices 152 communicate the subchamber 118 to the subchamber 124. The orifices 152 may be designed to create a pressure drop from subchamber 118 into subchamber 124. A worker in this art would be able to design the orifices 152 to achieve a desired pressure drop.

As shown in this figure, the radially extending leg 140 extends in a direction which is radially inward, but also has an axial component in an aft direction extending from the head 128 to the foot 142. The angle allows for the pressure drop to force the seal separator 122 upward and aft rather than inboard into the CMC BOAS. It is desirable that little downward force presses into the center of the BOAS. Other alternative embodiments may have no angle.

Since the pressure in chamber 124 is lower, the force $F_A$ will also be lower and there will be less challenges in a force imbalance between rotation 116 and chamber 124.

Figure 3A:
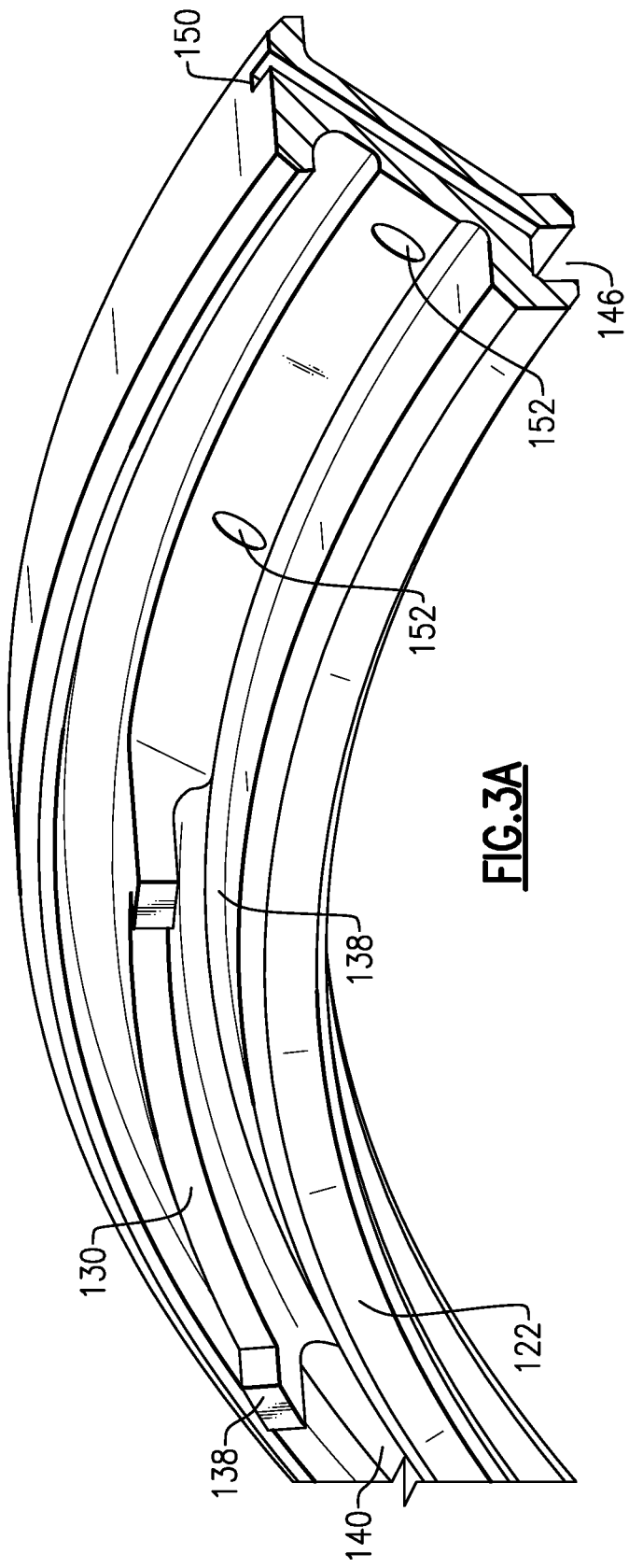
FIG. 3A shows a seal separator that may be utilized in the FIG. 2A turbine section.

FIG. 3A shows details of the seal separator 122. This figure can be best understood when considered in combination with FIG. 2A.

The hooks 138 have circumferentially intermediate abutting faces 130. It should be understood that faces 130 abut the finger 134, while hooks 138 extend into slots 136 preventing rotation.

The orifices 152 are circumferential intermediate the hooks 138. Slot 150 is shown at a circumferential end. Seal groove 146 is also shown.

Figure 3B:
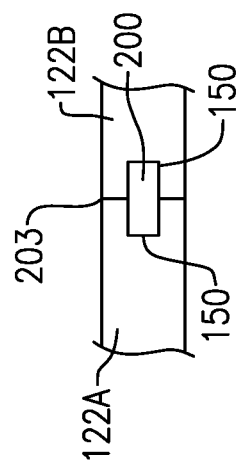
FIG. 3B shows a detail of a seal between adjacent seal separators.

FIG. 3B shows a detail wherein a circumferential gap 203 is illustrated between adjacent seal separators 122A and 122B. In one embodiment, there may be three separate seal separators 122, however, other numbers may be utilized including a full hoop seal separator extending for a full 360°.

A feather seal 200 is illustrated in the feather seal slots 150 and spanning the gap 203 between the seal separators 122A and 122B.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a turbine blade rotating about an axis of rotation defining an axial direction;
   a blade outer air seal positioned radially outward of a radially outer tip of said turbine blade, said blade outer air seal having a forward support and an aft support, with said forward support supported on a forward hook from a blade outer air seal support and said aft support supported on an aft hook from said blade outer air seal support, and said blade outer air seal having a central web extending between said forward support and said aft support and radially outwardly of said turbine blade radially outer tip, and a radially outer chamber defined radially outwardly of said central web, and axially intermediate said forward support and said aft support, and said radially outer chamber being defined between said central web and said blade outer air seal support;
   said radially outer chamber being divided into at least two separate subchambers maintained at two different pressures, with a forward subchamber being at a higher pressure than an aft subchamber, and a seal separator separating said forward and aft subchambers, said seal separator being a separate component relative to said blade outer air seal support;
   wherein said seal separator having a plurality of orifices metering flow to achieve said lower pressure in said aft subchamber, and air passing from said forward subchamber into said aft subchamber through said plurality of orifices;
   where in said seal separators include a radially outer head positioned in a slot in said blade out air seal support;
   wherein said head maintains a seal in a seal groove in said blade outer air seal support; and
   wherein each said seal separator has a leg extending radially inward from said head to a seal separator foot and said foot maintaining a second seal against a radially outer surface of said central web, said second seal being received in a groove in said foot.

2. The gas turbine chamber as set forth in claim 1, wherein there are a plurality of circumferentially spaced seal separators.

3. The gas turbine chamber as set forth in claim 2, wherein seals are positioned in circumferential ends of said circumferentially separate seal separators to seal a circumferential gap between adjacent ones of said circumferentially separate seal separators.

4. The gas turbine chamber as set forth in claim 3, wherein each said seal separator having said plurality of orifices metering flow to achieve said lower pressure in said aft subchamber.

5. The gas turbine chamber as set forth in claim 4, wherein seal separator hooks are received in a static structure to axially position each said seal separator.

6. The gas turbine chamber as set forth in claim 5, wherein said seal separator hooks further prevents rotation of each said seal separator about said axis of rotation.

7. The gas turbine chamber as set forth in claim 6, wherein said seal separator hooks extend in a ditch in a finger from said blade outer air seal support.

8. The gas turbine chamber as set forth in claim 1, wherein said leg extends in a direction having a radially inward component and an axially aft component when extending from said head to said foot.

9. The gas turbine chamber as set forth in claim 1, wherein seal separator hooks are received in a static structure to axially position said seal separator.

10. The gas turbine chamber as set forth in claim 9, wherein said seal separator hooks further prevents rotation of said seal separator about said axis of rotation.

11. The gas turbine chamber as set forth in claim 10, wherein said seal separator hooks extend in a ditch in a finger from said blade outer air seal support.

12. A gas turbine engine comprising:
a turbine blade rotating about an axis of rotation defining an axial direction;
a blade outer air seal positioned radially outward of a radially outer tip of said turbine blade, said blade outer air seal having a forward support and an aft support, with said forward support supported on a forward hook from a blade outer air seal support and said aft support supported on an aft hook from said blade outer air seal support, and said blade outer air seal having a central web extending between said forward support and said aft support and radially outwardly of said turbine blade radially outer tip, and a radially outer chamber defined radially outwardly of said central web, and axially intermediate said forward support and said aft support, and said radially outer chamber being defined between said central web and said blade outer air seal support;
said radially outer chamber being divided into at least two separate subchambers maintained at two different pressures, with a forward subchamber being at a higher pressure than an aft subchamber, and a seal separator separating said forward and aft subchambers, said seal separator being a separate component relative to said blade outer air seal support; and
wherein said seal separator having a plurality of orifices metering flow to achieve said lower pressure in said aft subchamber, and air passing from said forward subchamber into said aft subchamber through said plurality of orifices;
wherein said seal separator includes a radially outer head positioned in a slot in said blade outer air seal support;
wherein said head maintains a seal in a seal groove in said blade outer air seal support; and
wherein said first and second seal are selected from a group including an O-ring, a rope seal, a W-shaped seal or an M-shaped seal.

* * * * *